US011226217B2

(12) United States Patent
Nakagaki et al.

(10) Patent No.: US 11,226,217 B2
(45) Date of Patent: Jan. 18, 2022

(54) FIELD DEVICE, SYSTEM, AND WAVEFORM DATA OUTPUT METHOD

(71) Applicant: Yokogawa Electric Corporation, Tokyo (JP)

(72) Inventors: Kenichi Nakagaki, Tokyo (JP); Shinnosuke Yoshida, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 205 days.

(21) Appl. No.: 16/108,218

(22) Filed: Aug. 22, 2018

(65) Prior Publication Data

US 2019/0072420 A1 Mar. 7, 2019

(30) Foreign Application Priority Data

Sep. 1, 2017 (JP) .............................. JP2017-168990

(51) Int. Cl.
*G01F 1/32* (2006.01)
*G01F 15/06* (2006.01)

(52) U.S. Cl.
CPC ............ *G01F 1/329* (2013.01); *G01F 1/3209* (2013.01); *G01F 15/063* (2013.01)

(58) Field of Classification Search
CPC .......... G01F 1/329; G01F 1/3209; G01F 1/32; G01F 15/00; G01F 15/063; G01D 21/00
See application file for complete search history.

(56) References Cited

U.S. PATENT DOCUMENTS 6,480,812 B1 11/2002 Wada et al.
2015/0346357 A1 12/2015 Sakai et al.

FOREIGN PATENT DOCUMENTS

| CN | 104977598 A | 10/2015 |
|----|-------------|---------|
| JP | 2001-153698 A | 6/2001 |
| JP | 2015-090290 A | 5/2015 |

OTHER PUBLICATIONS

Hondoh et al., A Vortex Flowmeter with Spectral Analysis Signal Processing, Nov. 5-7, 2001, SIcon'01 Sensors for Industry Conference, Rosemont, Illinois, USA, pp. 35-40 (Year: 2001).*
Ito et al., Compressibility Compensation Inside Field Device Using FDT Configuration Software, Sep. 13-18, 2011, SICE Annual Conference 2011, Waseda University, Tokyo, Japan, pp. 106-110 (Year: 2011).*
Sun et al., The Simulation of Vortex Flowmeter Detector Based on ANSYS and the Design of Anti-Resonance Piezoelectric Detector, 2011 IEEE, 6 pp. (Year: 2011).*
IEEE Xplore Search Results, Apr. 12, 2021, 1 pp. (Year: 2021).*

* cited by examiner

*Primary Examiner* — Toan M Le
(74) *Attorney, Agent, or Firm* — Sughrue Mion, PLLC

(57) ABSTRACT

A field device includes a sensor configured to detect a physical quantity and to output the physical quantity as a sensor signal, a signal processor configured to process the sensor signal and to output the sensor signal as a processing result signal, a calculation processor configured to calculate output value data based on the processing result signal, an outputter configured to output the output value data to the outside, and a waveform acquirer configured to store waveform data of at least one signal among the sensor signal, the processing result signal, and a processing process signal that is a signal in a processing process in the signal processor, wherein the calculation processor is configured to acquire the waveform data from the waveform acquirer and to output the waveform data via the outputter.

17 Claims, 13 Drawing Sheets

FIELD DEVICE, SYSTEM, AND WAVEFORM DATA OUTPUT METHOD

BACKGROUND

Technical Fields

The present invention relates to a field device, a system, and a waveform data output method.

Priority is claimed on Japanese Patent Application No. 2017-168990, filed Sep. 1, 2017, the contents of which are incorporated herein by reference.

Related Art

In the related art, there is a field device configured to detect a physical quantity and output data on the physical quantity from an output circuit. Here, the physical quantity can be qualities of various types. For example, a flow rate, a temperature, a pressure, and the like of a fluid used in plant control may be exemplified. For example, such a field device digitizes an electrical signal detected using a sensor and obtains an output value by performing a calculation process as necessary based on the digital signal.

In Japanese Unexamined Patent Application Publication No. 2001-153698, a configuration example of a vortex flowmeter which is one type of field device is disclosed. In particular, FIG. 1 in Japanese Unexamined Patent Application Publication No. 2001-153698 shows a functional block diagram of a vortex flowmeter.

A vortex flowmeter generally has the following configuration. That is, a vortex shedder bar is disposed so that a flow of a fluid is blocked. According to the flow of the fluid, a Karman vortex corresponding to a flow rate is generated behind (on the downstream side of) the vortex shedder bar. The vortex flowmeter counts the Karman vortexes and converts the count value into a flow rate. As a more specific configuration example, in a vortex flowmeter, a piezoelectric element may be used as a unit for detecting an alternating lift that is generated by the Karman vortex. The charge signal detected by the piezoelectric element is converted into a voltage signal by a charge amplifier and is subjected to analog to digital conversion. Then, based on the digitally converted signal, a vortex signal (similar to a sine wave) is extracted by signal processing performed by a frequency analyzer. The extracted vortex signal is pulsed by a Schmitt trigger circuit and a count circuit counts the number of pulses within a predetermined time. Then, a microprocessor (central processing unit (CPU)) performs frequency calculation, flow rate calculation, correction calculation, and the like based on data on the number of pulses per unit time. Then, a signal representing a numeric value of a calculation result from the microprocessor is converted into a desired form in the output circuit and output.

In a vortex flowmeter that is directly attached to a pipe in a plant facility or the like, due to piping vibration, other mechanical vibrations, shaking caused by a processing fluid, electrical noise, and the like, an output flow rate may differ from an expected value and a flow rate may not be stable in many cases. In that case, not only a final output value, but also a vortex waveform detected by the vortex flowmeter is directly observed and a failure analysis may be desired therefor. In this case, in order to check the state of the detected vortex waveform or pulse signal, a measurement instrument such as an oscilloscope is connected to an observation terminal provided in the device.

In addition, in not only a vortex flowmeter but also a field device generally, it is desired to directly observe not only the final output value but also waveforms of various signals in the processing process in some cases.

In order to observe a signal waveform inside a field device, a measurement instrument such as an oscilloscope is necessary. However, in general, since a measurement instrument such as an oscilloscope is expensive, it is not necessarily provided by a user. When a field device is installed in a recessed place, it may be difficult for a person to perform an operation by bringing an oscilloscope or the like close to the field device. In addition, a place in which the field device is used may be an explosion-proof area in many cases, and when a measurement instrument such as an oscilloscope is a non-explosion proof device, it is not possible to bring it into that place. In such a case, it is very difficult to connect an oscilloscope to the field device and check a signal waveform using an oscilloscope or the like in a site in which the field device is installed.

Even if a field device is a vortex flowmeter, for the same reason, there may be a situation in which it is difficult to observe a vortex waveform by bringing an oscilloscope or the like into the site in which the vortex flowmeter is installed.

SUMMARY

A field device may include a sensor configured to detect a physical quantity and to output the physical quantity as a sensor signal, a signal processor configured to process the sensor signal and to output the sensor signal as a processing result signal, a calculation processor configured to calculate output value data based on the processing result signal, an outputter configured to output the output value data to the outside, and a waveform acquirer configured to store waveform data of at least one signal among the sensor signal, the processing result signal, and a processing process signal that is a signal in a processing process in the signal processor, wherein the calculation processor is configured to acquire the waveform data from the waveform acquirer and to output the waveform data via the outputter.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a field device, a system, and a waveform data output method which can easily acquire waveform data representing a signal waveform inside a field device even when it is difficult to perform an operation close to the field device or even when it is difficult to directly connect a measurement instrument such as an oscilloscope to the field device.

Embodiments of the present invention will be described below with reference to the drawings.

First Embodiment

Figure 1:
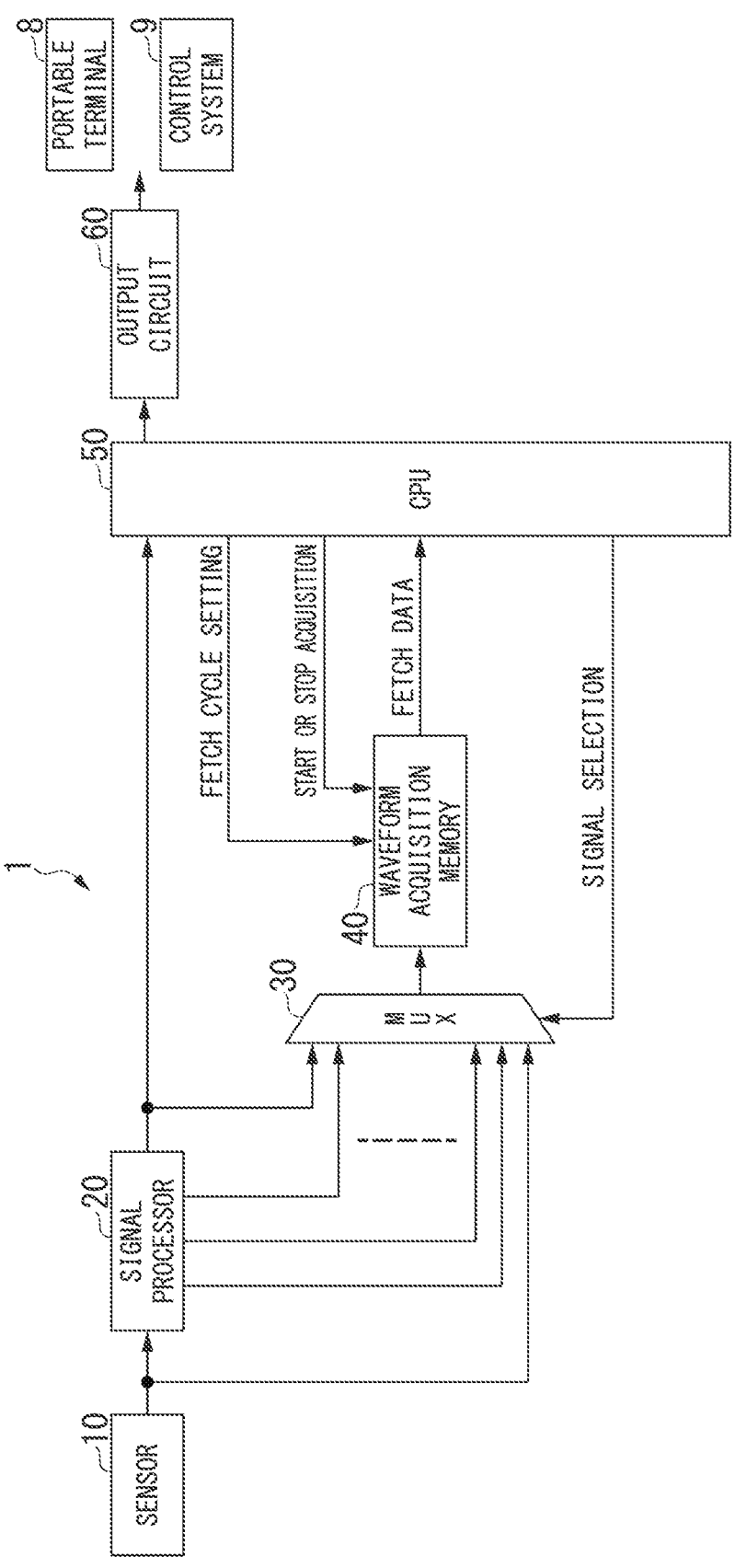
FIG. 1 is a block diagram showing a schematic functional configuration of a measurement system according to a first embodiment of the present invention.

FIG. 1 is a block diagram showing a schematic functional configuration of a measurement system according to the present embodiment. As shown in FIG. 1, the measurement system includes a field device 1, a portable terminal 8, and a control system 9. Here, the measurement system may further include other devices. Thus, the field device 1 includes a sensor 10, a signal processor 20, a multiplexer (MUX) 30, a waveform acquisition memory 40, a CPU 50, and an output circuit 60. These functional units are realized using, for example, an electronic circuit. In addition, the functional units may include a storage unit such as a semiconductor memory as necessary therein. Here, the waveform acquisition memory 40 is also called a "waveform acquirer." In addition, the CPU 50 is also called a "calculation processor." In addition, the output circuit 60 is also called an "outputter." Functions of respective units shown here will be described as follows.

Here, data representing a waveform of a signal may be referred below to as "waveform data" or "data regarding a waveform." The waveform data is expressed as a series of signal waveform sample values at sampling points. That is, one signal waveform data is time-series numeric value data.

The field device 1 is a device that detects a physical quantity, performs a calculation based on the physical quantity as necessary, and outputs data regarding the physical quantity or a calculation result. In addition, the field device 1 according to the present embodiment outputs signal waveform data in a processing process before output data (a process value) is obtained. Here, while only one field device 1 is shown in the drawing, the measurement system may include a plurality of field devices 1.

The portable terminal 8 is a terminal device configured to receive data from the field device 1. The portable terminal 8 is realized using, for example, a personal computer, a smartphone, a tablet terminal, a watch type terminal, or a wearable terminal.

The control system 9 is also a terminal device configured to receive data from the field device 1. The control system 9 is realized using, for example, a personal computer or a server type computer. The control system 9 may be a system constituted by connecting a plurality of devices.

While both the portable terminal 8 and the control system 9 are shown in FIG. 1, the measurement system may include only either of the portable terminal 8 and the control system 9.

The portable terminal 8 and the control system 9 are also called an "external device" which indicates a device provided outside the field device 1. The portable terminal 8 and the control system 9 each include a CPU and the CPU can execute a program. The program has a function of receiving data (process value data and waveform data) transmitted from the field device 1 and a function of drawing a waveform representing the received waveform data on a screen. The waveform data output from the field device 1 is time-series numeric value data. The program has a function of reproducing an original signal waveform and displaying it on a screen based on the time-series numeric value data.

Next, functions of respective units included in the field device 1 will be described.

The sensor 10 detects a physical quantity or a physical condition and outputs it as an electrical signal (sensor signal). The sensor 10 may have an A/D conversion (analog-to-digital) function. While the sensor 10 outputs a digitized electrical signal in the present embodiment, a sensor configured to output an analog signal before digitization may be used.

The signal processor 20 appropriately processes a signal output from the sensor 10 and outputs a desired signal (processing result signal). The signal processor 20 of the present embodiment uses a plurality of stages in the processing process and can output a signal in each of the stages. As an example, when the signal processor 20 performs signal frequency analysis processing and a Schmitt trigger circuit is provided after the frequency analysis processing function, it is possible to deliver a signal output in the frequency analysis processing to the multiplexer 30.

The multiplexer (MUX) 30 receives a signal output from the sensor 10 and a signal output from the signal processor 20, multiplexes these signals, and supplies the result to the waveform acquisition memory 40. In the present embodiment, the multiplexer 30 receives signals from a plurality of units in the signal processor 20. However, some of lines (FIG. 1) input to the multiplexer 30 may be omitted. That is, the multiplexer 30 receives a plurality of signals among a sensor signal output from the sensor 10, a processing result signal output from the signal processor 20, and a processing process signal which is a signal in the processing process of the signal processor 20, multiplexes these plurality of signals and delivers the result to the waveform acquisition memory 40. A signal of "signal selection" received by the multiplexer 30 from the CPU 50 indicates an input signal selected at that time. When the signal of "signal selection" is sequentially changed at predetermined time intervals, the multiplexer 30 multiplexes input signals. Here, when the signal of "signal selection" is instructed for certain signals among input signals, only these certain signals can be selected, multiplexed and output. In addition, all signals input to the multiplexer 30 may be always multiplexed and output.

Here, the field device 1 may not include the multiplexer 30. When there is only one signal line that the waveform acquisition memory 40 acquires, there is no need to provide the multiplexer 30.

The waveform acquisition memory 40 acquires a signal from the upstream side (for example, from the multiplexer 30) and stores data of the signal waveform. The waveform acquisition memory 40 includes a storage unit itself (such as a semiconductor memory) configured to store data and a control unit configured to control the storage unit. The control unit has a function of receiving data from the outside and writing the data in the storage unit, and reading data from the storage unit and delivering the data to the outside. In addition, the waveform acquisition memory 40 may acquire a plurality of multiplexed signals and store data of the plurality of signal waveforms. That is, the waveform acquisition memory 40 has a demultiplexing function therein. Data that the waveform acquisition memory 40 stores is a time-series numeric value for each signal. An original waveform can be reproduced based on the time-series numeric value data. The waveform acquisition memory 40 can output waveform data of an arbitrary signal from an arbitrary time point based on a signal read from the outside (for example, from the CPU 50). In addition, the waveform acquisition memory 40 can receive setting of a fetch cycle of waveform data based on a control signal from the outside (for example, from the CPU 50). This fetch cycle is a cycle during which the CPU 50 fetches waveform data from the waveform acquisition memory 40. In addition, the waveform acquisition memory 40 can control starting or ending of capturing waveform data based on a control signal from the outside (for example, from the CPU 50).

The CPU 50 performs a predetermined calculation based on a signal output from the signal processor 20 or using parameter values set in advance as necessary, and delivers numeric value data (output value data and process value) of a calculation result to the output circuit 60. As an example, when the field device 1 is a vortex flowmeter, the CPU 50 computes a numeric value of a flow rate of a fluid based on a count value of a pulse (a pulse corresponding to a cycle of a Karman vortex) output from the signal processor 20 and parameter values (for example, values related to a size and a shape of a flow path).

In addition, the CPU 50 transmits a control signal or a command to the waveform acquisition memory 40 and fetches waveform data (fetched data) from the waveform acquisition memory 40.

In addition, the CPU 50 receives a command from an external device through the output circuit 60 and transmits the process value data and waveform data to the external device through the output circuit 60 in response to the command.

In addition, the CPU 50 may transmit a signal for instructing that the waveform acquisition memory 40 start or stop acquiring of waveform data. In addition, the CPU 50 may transmit a signal for instructing setting of a fetch cycle of waveform data to the waveform acquisition memory 40.

A procedure of exchanging data between the CPU 50 and a peripheral functional unit or a circuit will be described below with reference to another drawing.

The output circuit 60 is a circuit having a function of a communication interface for an external device.

The output circuit 60 transmits data (output value data and waveform data) delivered from the CPU 50 to the portable terminal 8 or the control system 9. In addition, the output circuit 60 includes "communication receiver" (not shown) therein and receives a command from the portable terminal 8 or the control system 9 and delivers the command to the CPU 50. Exchange of bidirectional communication through the output circuit 60 will be described below in detail. Here, the output circuit 60 may have a function of outputting an output value according to the standard 4-20 mA.

Figure 2:
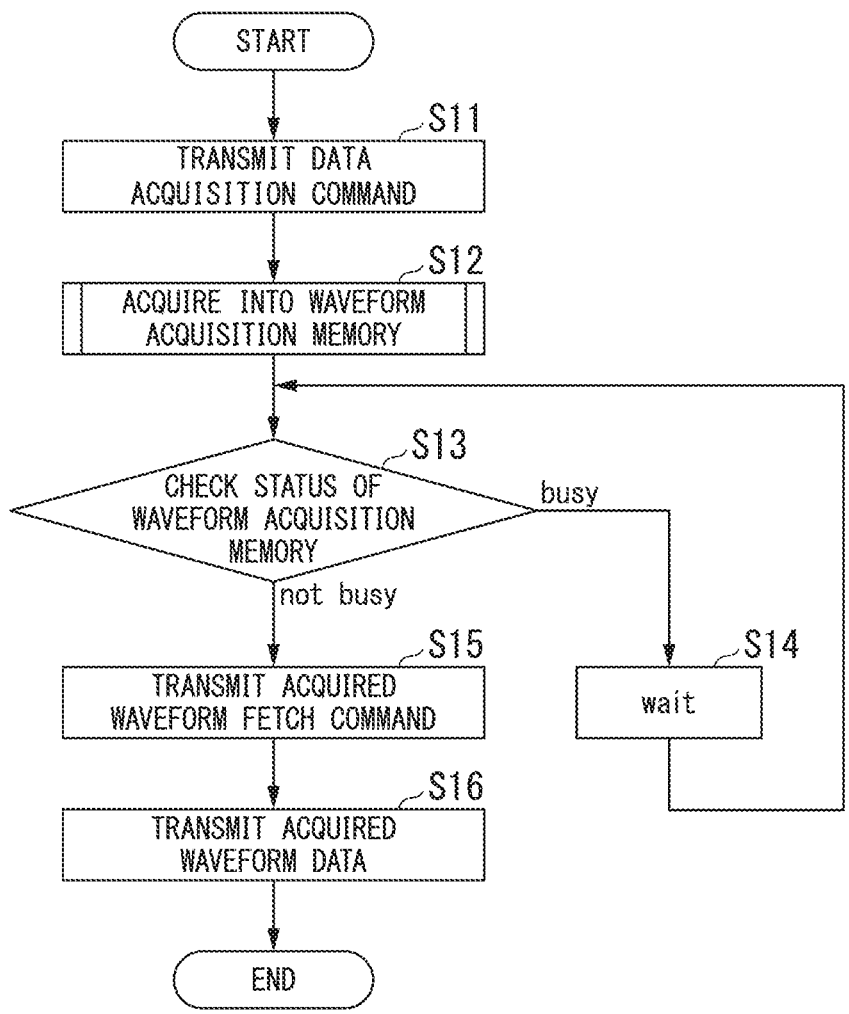
FIG. 2 is a flowchart showing a processing procedure for a CPU in a field device according to the first embodiment to acquire waveform data.

FIG. 2 is a flowchart showing a processing procedure for the CPU 50 in the field device 1 to acquire waveform data. The flowchart will be described below.

In Step S11, the CPU 50 transmits a waveform data acquisition command to the waveform acquisition memory 40. The waveform acquisition memory 40 receives the waveform data acquisition command. The waveform data acquisition command is a command for instructing that the waveform memory 40 acquire waveform data.

In Step S12, the waveform acquisition memory 40 acquires data into the waveform acquisition memory based on the waveform data acquisition command. Specifically, the waveform acquisition memory 40 acquires waveform data from the multiplexer 30. In other words, the CPU 50 calls a function of data acquisition on the side of the waveform acquisition memory 40. Here, details of the process in this step will be described below with reference to FIG. 3.

In Step S13, the CPU 50 checks a status of the waveform acquisition memory 40. When the status of the waveform acquisition memory 40 is "busy" (that is, access is not possible), the process advances to Step S14. When the status of the waveform acquisition memory 40 is "not busy" (that is, access is possible), the process advances to Step S15. Here, as will be described below, the status is "busy" during the process in which the waveform acquisition memory 40 stores data in the memory.

When the process advances to Step S14, the CPU 50 waits for a predetermined time in Step S14. After that time, the process returns to Step S13.

When the process advances to Step S15, the CPU 50 transmits an acquired waveform fetch command to the waveform acquisition memory 40 in Step S15. The waveform acquisition memory 40 receives the acquired waveform fetch command. In other words, the CPU 50 issues an instruction to start fetch of waveform data from the waveform acquisition memory 40.

In Step S16, the CPU 50 receives the acquired waveform data from the waveform acquisition memory 40. In other words, acquired data is transferred from the waveform acquisition memory 40 to the CPU 50. When the process in this step ends, the field device 1 ends all processes in this flowchart.

According to the above process, the data acquired by the CPU 50 can be transmitted from the output circuit 60 to the outside.

Here, when acquisition of waveform data in the waveform memory 40 ends, the CPU 50 transmits a waveform data acquisition end command to the waveform memory 40.

In addition, when the CPU 50 ends fetch of acquired waveform data from the waveform memory 40, the CPU 50 transmits the acquired waveform fetch end command to the waveform memory 40.

Figure 3:
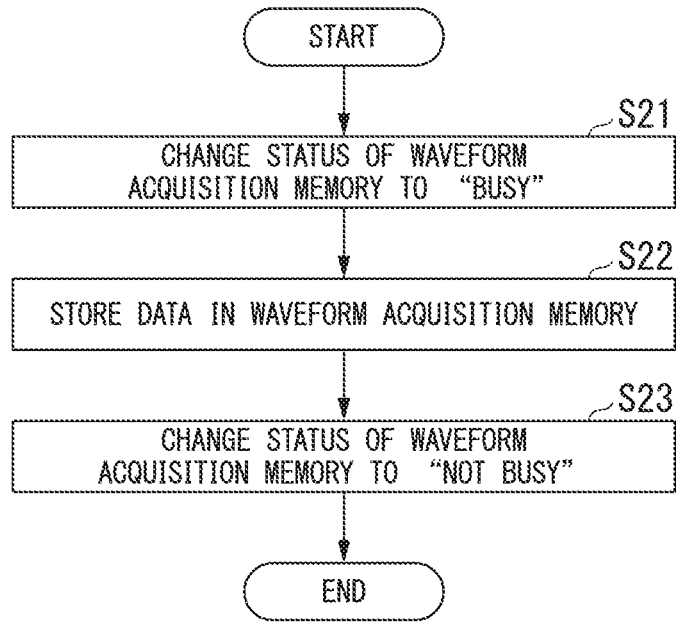
FIG. 3 is a flowchart showing a processing procedure in which a waveform acquisition memory according to the first embodiment acquires waveform data and stores it in a memory.

FIG. 3 is a flowchart showing a processing procedure in which the waveform acquisition memory 40 acquires waveform data and stores it in the memory. The process shown in this drawing is a process called in Step S12 in FIG. 2. The flowchart will be described below.

In Step S21, the waveform acquisition memory 40 changes the status of the waveform acquisition memory 40 to "busy" (that is, access is not possible).

Next, in Step S22, the waveform acquisition memory 40 acquires waveform data and stores it in the memory. When storing of predetermined data in the memory is completed, the process proceeds to the next step.

Next, in Step S23, the waveform acquisition memory 40 changes the status of the waveform acquisition memory 40 to "not busy" (that is, access is possible). When the process in this step ends, all processes in this flowchart end.

Next, functions of the portable terminal 8 which is a component of the measurement system will be described.

Figure 4:
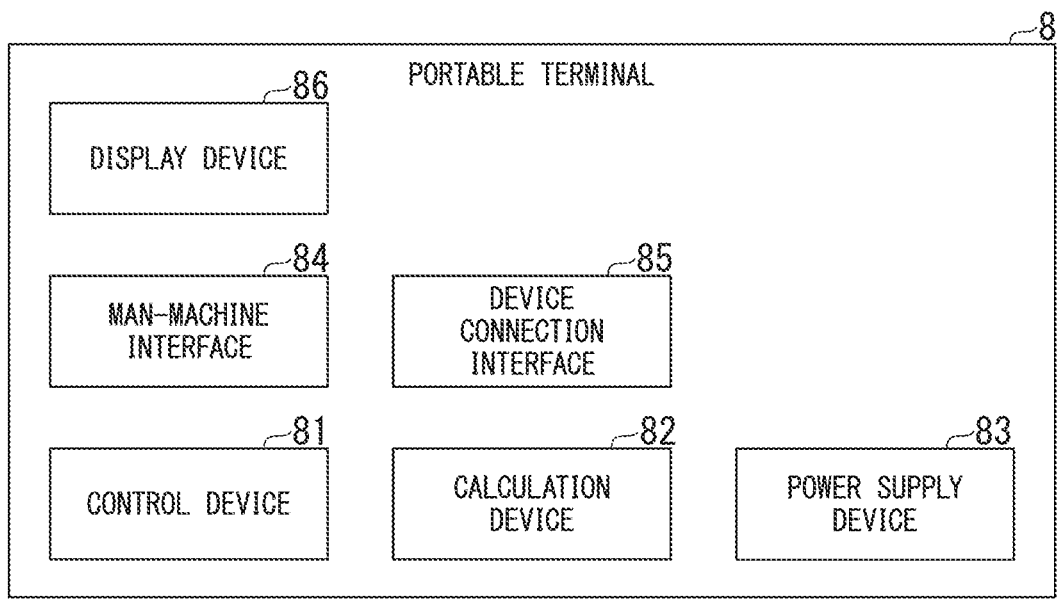
FIG. 4 is a block diagram showing a schematic functional configuration of a portable terminal 8 according to the first embodiment.

FIG. 4 is a block diagram showing a schematic functional configuration of the portable terminal 8. As shown in FIG. 4, the portable terminal 8 includes a control device 81, a calculation device 82, a power supply device 83, a man-machine interface 84, a device connection interface 85, and a display device 86.

The control device 81 controls the entire portable terminal 8.

The calculation device 82 executes a given program. In addition, the calculation device 82 receives information on a user operation through the man-machine interface 84, and outputs information to be presented to the user.

The power supply device 83 receives power from the outside, and supplies power to the units of the portable terminal 8. In addition, the power supply device 83 includes a built-in battery, and supplies power to the units of the portable terminal 8.

For example, the man-machine interface 84 receives a signal according to an operation of a keyboard and a mouse or a touch operation, and transmits the signal to the calculation device 82. In addition, the man-machine interface 84 displays information output from the calculation device 82 on the display device 86.

The device connection interface 85 can connect the portable terminal 8 to another device. The device connection interface 85 performs, for example, bidirectional communication with the field device 1. According to the function of the device connection interface 85, the portable terminal 8 can be directly connected to the field device 1 through a signal line or the like, or can be connected to the field device 1 via a communication network.

The display device 86 displays information delivered from the man-machine interface 84 on a screen. For example, the display device 86 may be a liquid crystal display device or other display units.

According to the above configuration, the portable terminal 8 receives waveform data delivered from the field device 1 and stores the waveform data as necessary. In addition, the portable terminal 8 can reproduce a waveform and display it on the screen based on waveform data (time-series numeric value data). A program having a function of receiving waveform data and displaying the waveform on the screen is stored in the internal storage unit. When the calculation device 82 in the portable terminal 8 executes the program, it is possible to display a signal waveform acquired in the field device 1.

Here, while the process in which the portable terminal 8 acquires waveform data and displays the waveform has been described, the control system 9 can perform the same process and thus display a waveform.

Figure 5A:
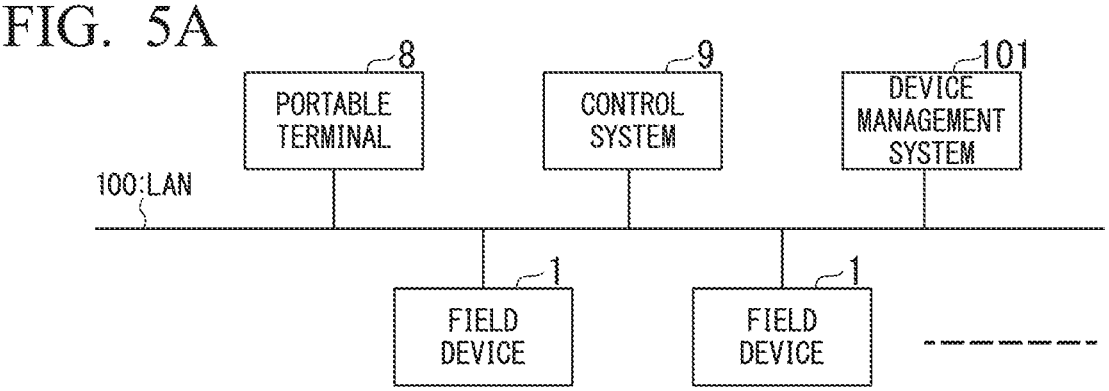
FIG. 5A shows schematic diagrams of modes of a network connection between devices constituting the measurement system according to the first embodiment.
Figure 5B:
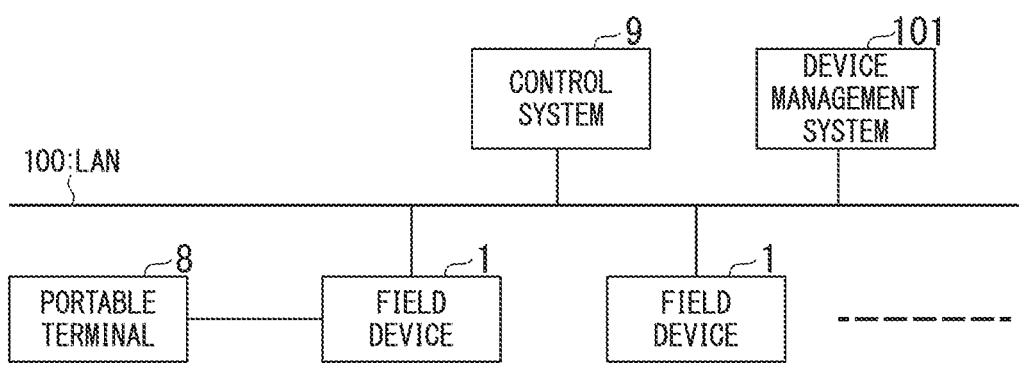
FIG. 5B shows schematic diagrams of modes of a network connection between devices constituting the measurement system according to the first embodiment.

FIG. 5A and FIG. 5B shows schematic diagrams of modes of a network connection between devices constituting the measurement system.

FIG. 5A shows a mode in which the field device 1, the portable terminal 8, the control system 9 (DCS), and a device management system 101 are connected to a local area network (LAN) 100. Here, the plurality of field devices 1 may be provided and connected to the LAN 100. In this case, mutual communication between the field device 1 and the portable terminal 8 is performed via the LAN 100. Communication is performed using, for example, an Internet protocol (IP), on the LAN 100.

FIG. 5B shows a mode in which the portable terminal 8 is directly connected (that is, through a communication unit other than the LAN 100) to one field device without the LAN 100. In this case, mutual communication between the field device 1 and the portable terminal 8 is performed without the LAN 100. Communication can be performed between the field device 1 and the portable terminal 8 according to, for example, a communication procedure that is independently determined.

Here, as described above, when an installed program is executed on the side of the portable terminal 8 or the control system 9, a waveform can be drawn based on waveform data received from the field device 1 and displayed on the screen.

Figure 6:
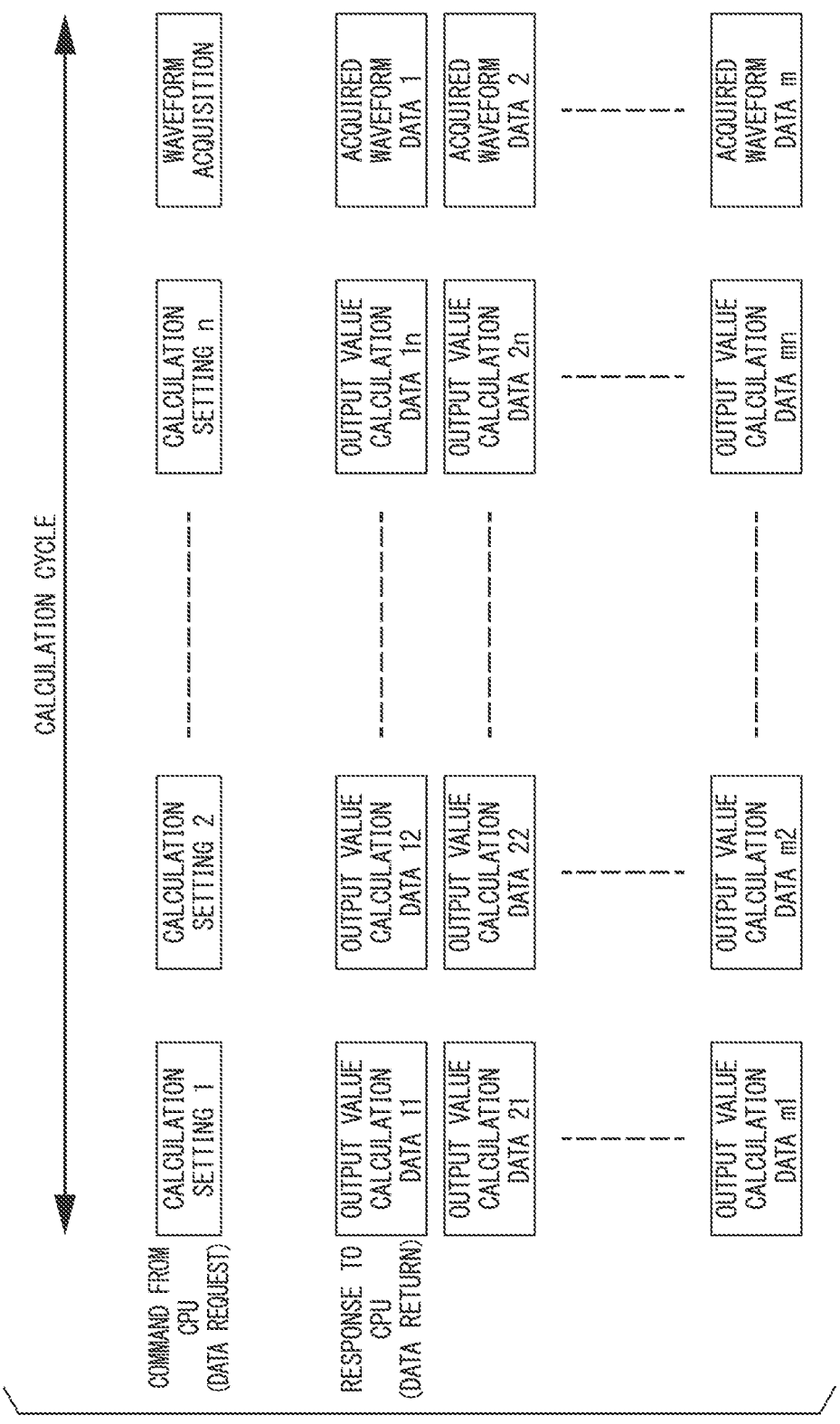
FIG. 6 shows timing charts of sequences of communication data that is exchanged between a signal processor 20 and a waveform acquisition memory 40 by the CPU according to the first embodiment.

FIG. 6 shows timing charts of sequences of communication data that is exchanged between the signal processor 20 and the waveform acquisition memory 40 by the CPU 50. FIG. 6 shows a command output from the CPU 50 and a response (data returned to the CPU 50) to the CPU 50. In FIG. 6, the horizontal axis represents time. FIG. 6 shows a sequence for one calculation cycle. The CPU 50 transmits a calculation setting command (from a calculation setting 1 to a calculation setting n in the drawing, here, n is a natural number) to the signal processor 20. In addition, the CPU 50 transmits a waveform acquisition command to the waveform acquisition memory 40. First, in the first cycle within the calculation cycle, the CPU 50 transmits the command "calculation setting 1." In addition, in the first cycle, the signal processor 20 transmits m pieces of data from output value calculation data 11 to output value calculation data m1 to the CPU 50 in response to the command "calculation setting 1." This similarly applies hereafter, and in the i-th cycle (here, 1≤i≤n), the CPU 50 transmits the command "calculation setting i." In addition, in the i-th cycle, the signal processor 20 transmits m pieces of data from output value calculation data 1$i$ to output value calculation data mi to the CPU 50 in response to command "calculation setting i." In cycles after the n-th cycle, the CPU 50 transmits a waveform acquisition command to the waveform acquisition memory 40. In addition, in this cycle, the waveform acquisition memory 40 transmits acquired waveform data 1 to acquired waveform data m to the CPU 50. Then, the cycle moves to the next calculation cycle. Such data transmission and reception are repeated for each calculation cycle. Accordingly, the CPU 50 acquires output value calculation data for calculating an output value from the signal processor 20, and acquires waveform data of a signal that is appropriately selected by the multiplexer 30 from the waveform acquisition memory 40.

Figure 7:
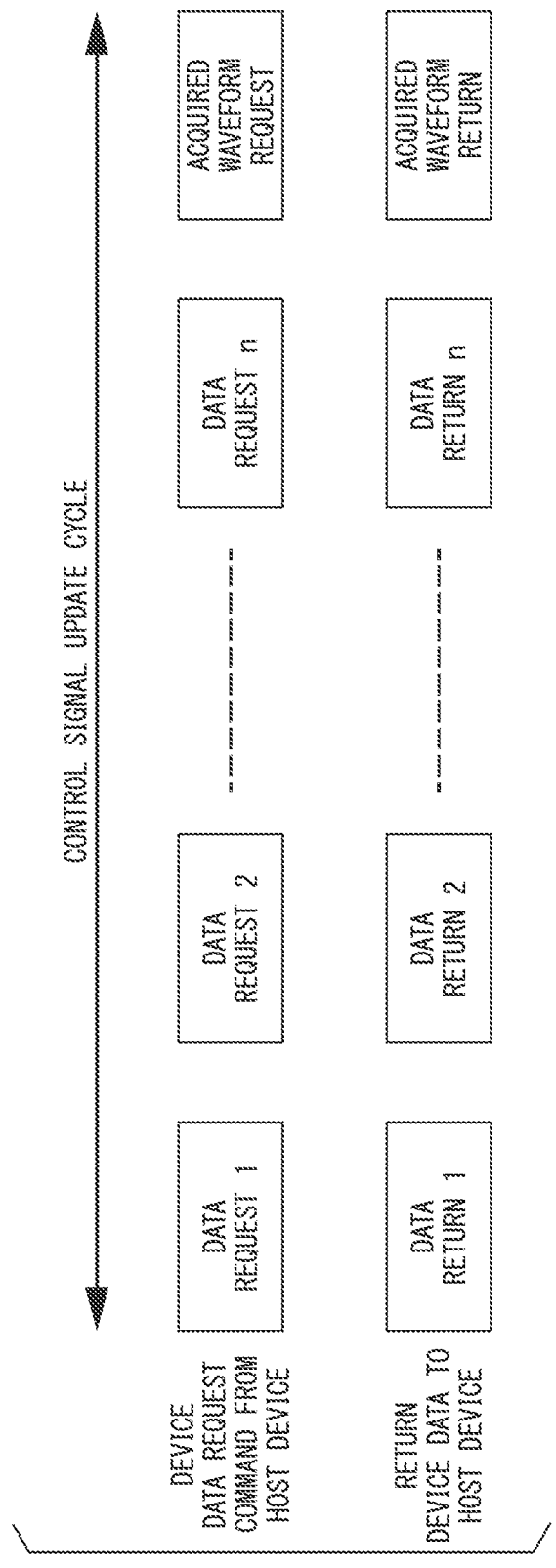
FIG. 7 shows timing charts of sequences of communication data that is exchanged between the CPU according to the first embodiment and a host device.

FIG. 7 shows timing charts of sequences of communication data that is exchanged between the CPU 50 and a host device. FIG. 7 shows a command that is received by the CPU 50 from the host device and a response (data returned to the host device) from the CPU 50 to the host device. Here, the host device is, for example, the portable terminal 8 or the control system 9. In FIG. 7, the horizontal axis represents time. FIG. 7 shows a sequence for one control signal update cycle. The CPU 50 receives a data request command and a waveform acquisition request command from the host device. In addition, the CPU 50 transmits data corresponding to the received command to the host device. In terms of time, first, in the first cycle within the control signal update cycle, the host device transmits a command "data request 1" to the CPU 50. The CPU 50 receives the command "data request 1." In addition, in the first cycle, the CPU 50 transmits a "data return 1" to the host device.

The "data return 1" is data including an output value of the field device 1. This similarly applies hereafter, and in the i-th cycle (here, 1≤i≤n), the host device transmits a command "data request i" to the CPU 50. The CPU 50 receives the command "data request i." In addition, in the i-th cycle, the CPU 50 transmits the "data return i" to the host device. In the cycle after the n-th cycle, the host device transmits an acquired waveform request command to the CPU 50. The CPU 50 receives the acquired waveform request command. In addition, in this cycle, the CPU 50 transmits data "acquired waveform return" to the host device. The data "acquired waveform return" includes a set of numeric value data representing a waveform of a selected signal. Thereby, the host device can acquire the output value from the field device 1 and acquire waveform data of the appropriately selected signal. In addition, the host device can draw the signal waveform on the screen using received waveform data.

Figure 8:
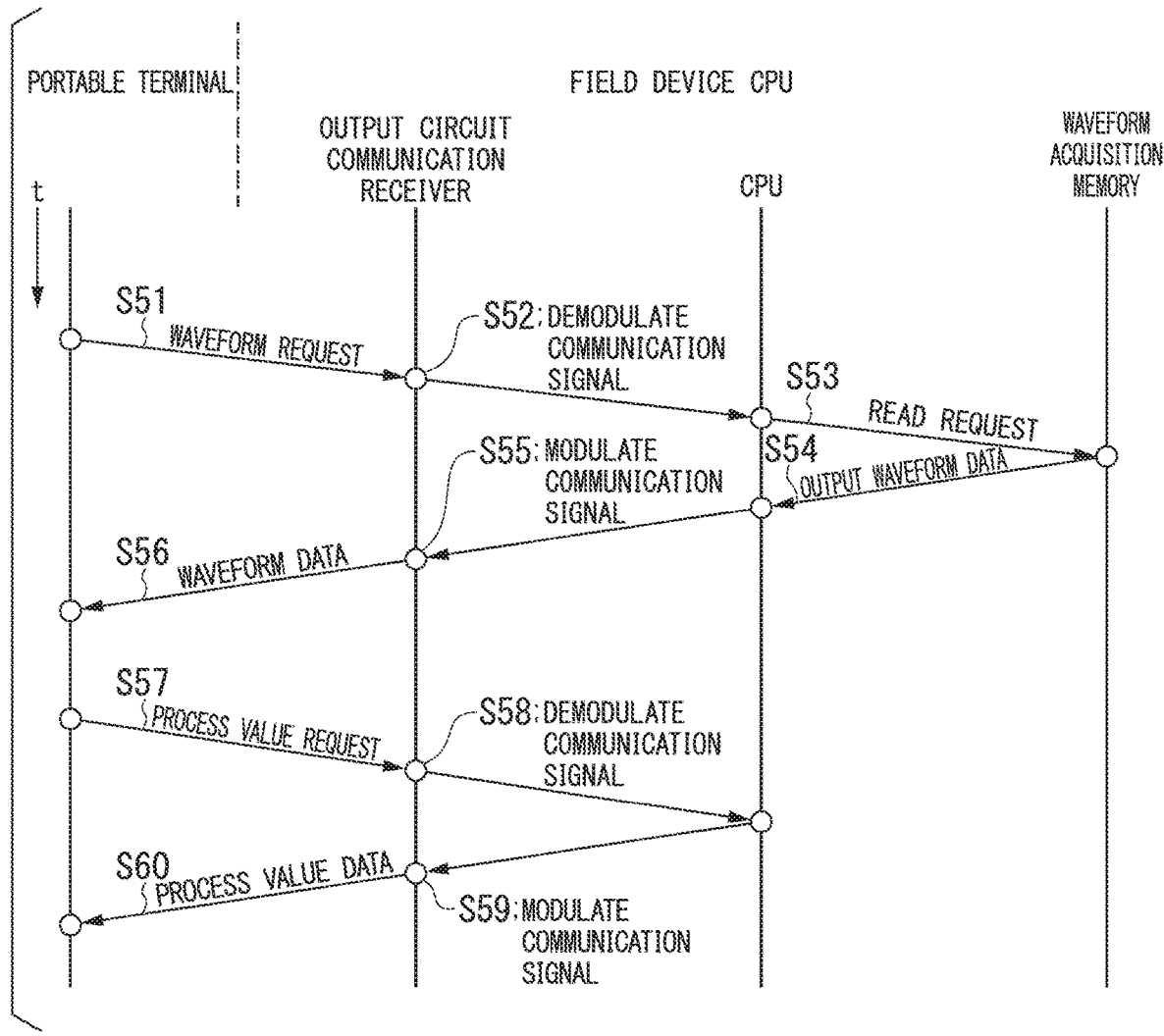
FIG. 8 is a sequence chart showing communication sequences between the portable terminal according to the first embodiment and a field device.

FIG. 8 is a sequence chart showing s communication sequences between the portable terminal 8 and the field device 1. In FIG. 8, the vertical axis represents time. Here, a communication receiver in FIG. 8 is a functional unit included in the field device 1, but the communication receiver is not shown in FIG. 1. Hereinafter, the sequence chart will be described below.

First, in Step S51, the portable terminal 8 (host device) transmits a waveform request command (an acquired waveform request in FIG. 7) to the field device 1. The communication receiver of the field device 1 receives a communication signal including the command.

Next, in Step S52, the communication receiver of the field device 1 demodulates the communication signal including the waveform request command.

Next, in Step S53, the CPU 50 that has interpreted the waveform request command transmits a read request (a waveform acquisition command in FIG. 6) to the waveform acquisition memory 40. The waveform acquisition memory 40 receives this read request.

Next, in Step S54, the waveform acquisition memory 40 transmits waveform data (acquired waveform data in FIG. 6) to the CPU 50 in response to the read request received in Step S53. The CPU 50 outputs the received waveform data from the output circuit 60.

Next, in Step S55, the output circuit 60 modulates the communication signal so that waveform data delivered from the CPU 50 is included.

Then, in Step S56, the output circuit 60 transmits the communication signal modulated in Step S55 to the portable terminal 8. That is, the output circuit 60 transmits waveform data (acquired waveform return in FIG. 7) to the portable terminal 8.

As above, according to the series of processes from Step S51 to S56, the portable terminal 8 acquires waveform data from the field device 1.

Then, processes after Step S57 are processes for the portable terminal 8 to acquire a process value.

In Step S57, the portable terminal 8 transmits a command of a process value request (one request from a data request 1 to a data request n in FIG. 7) to the field device 1. The communication receiver of the field device 1 receives a communication signal including the command.

Next, in Step S58, the communication receiver of the field device 1 demodulates the communication signal including the process value request command. The CPU 50 that has interpreted the process value request command outputs the computed process value to the output circuit 60.

Next, in Step S59, the output circuit 60 modulates the communication signal using process value data delivered from the CPU 50.

Then, in Step S60, the output circuit 60 transmits the communication signal modulated in Step S59 to the portable terminal 8. That is, the output circuit 60 transmits a process value data (one piece of data from a data return 1 to a data return n in FIG. 7) to the portable terminal 8.

As described above, according to the series of processes from Step S57 to S60, the portable terminal 8 acquires process value data from the field device 1.

Next, timings of signals exchanged when the field device 1 outputs data will be described.

Figure 9:
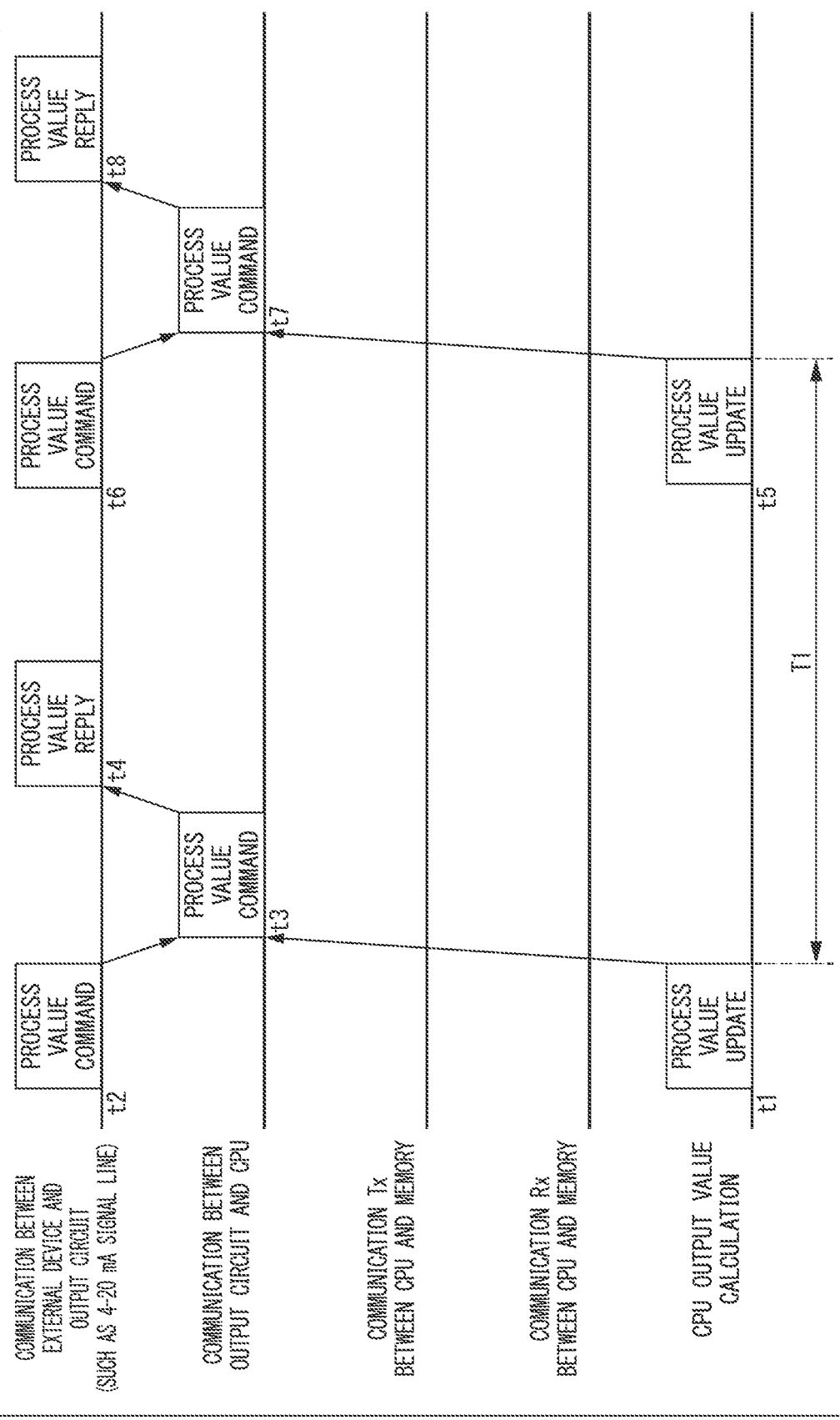
FIG. 9 shows timing charts of timings of signals when the field device according to the first embodiment outputs a process value.
Figure 10:
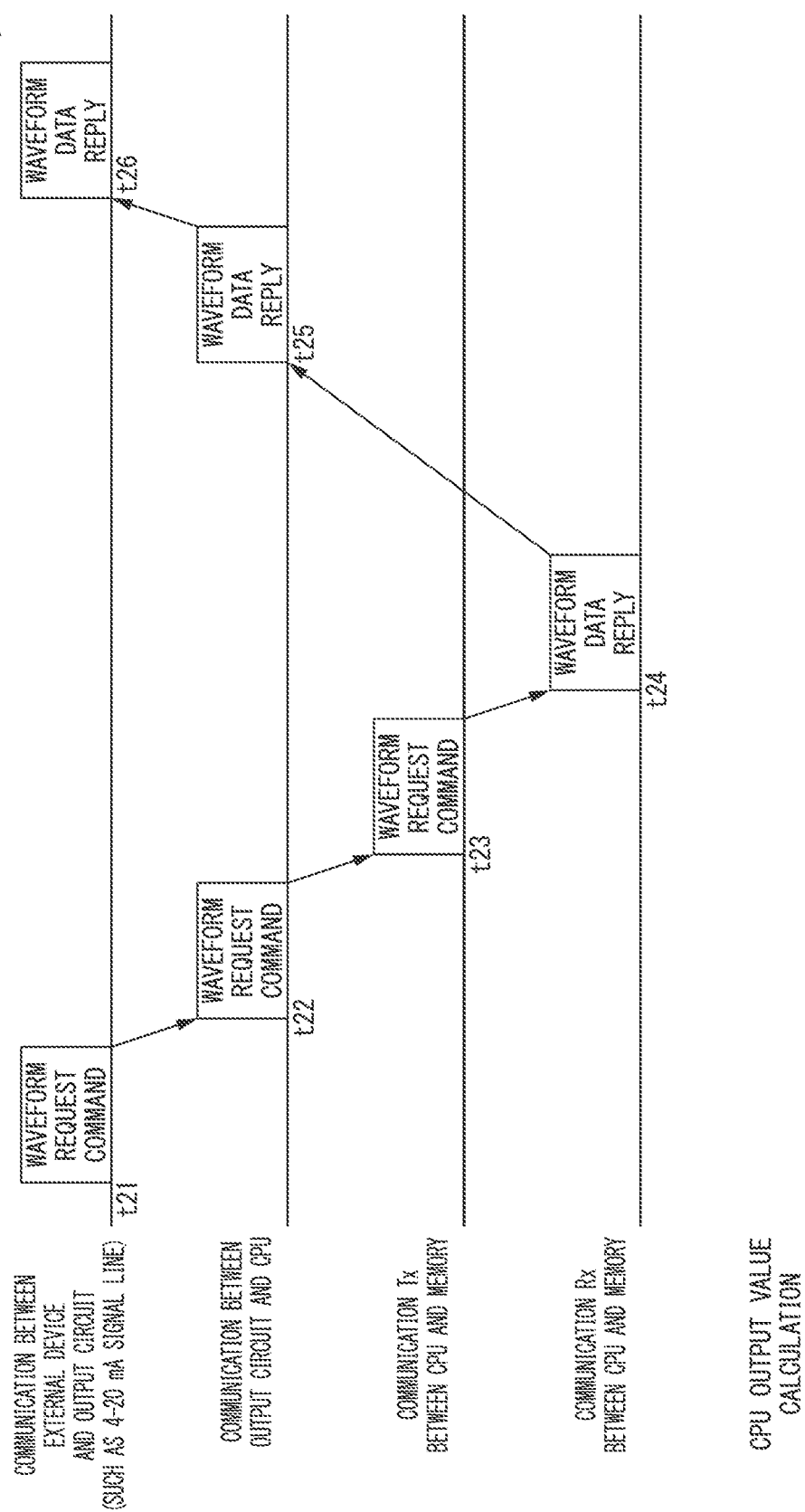
FIG. 10 shows timing charts of timings of signals when the field device according to the first embodiment outputs waveform data.

FIG. 9 and FIG. 10 are timing charts showing timings of signals that are transmitted and received by components of the field device 1. FIG. 9 shows timings of signals when the field device 1 outputs a process value. In addition, FIG. 10 shows timings of signals when the field device 1 outputs waveform data. In FIG. 9 and FIG. 10, the horizontal direction is the time axis. In addition, FIG. 9 and FIG. 10 show "communication between external device and output circuit", "communication between output circuit and CPU", "communication Tx between CPU and memory", "communication Rx between CPU and memory", and "CPU output value calculation". The "communication between external device and output circuit" shows communication between an external device (for example, the portable terminal 8) and the output circuit 60.

Communication is performed using, for example, a 4-20 mA (milliampere) signal line between the external device and the output circuit 60. The "communication between output circuit and CPU" shows communication between the output circuit 60 and the CPU 50.

The "communication Tx between CPU and memory" shows communication between the CPU 50 and the waveform acquisition memory 40 and shows (Tx) communication through which a signal is transmitted from the CPU 50 side. The "communication Rx between CPU and memory" shows communication between the CPU 50 and the waveform acquisition memory 40 and (Rx) communication (that is, transmission from the side of the waveform acquisition memory 40) through which a signal is received from the side of the CPU 50. The "CPU output value calculation" shows a process of calculating an output value inside the CPU 50. Hereinafter, description will be provided according to time series of the charts in FIG. 9 and FIG. 10.

In FIG. 9, the CPU 50 calculates a process value in a cycle that starts from the time t1.

In addition, in a cycle that starts from the time t2, communication is performed between the external device and the output circuit 60, and a process value command (a data request in FIG. 7 and a process value request in FIG. 8) is transmitted from the external device to the output circuit 60. As described above, the output circuit 60 includes a communication receiver and the communication receiver receives a process value command from the external device.

In addition, in a cycle that starts from the time t3, communication is performed between the output circuit 60 and the CPU 50, and the process value command is delivered from the output circuit 60 to the CPU 50. In addition, the CPU 50 delivers the process value that is already computed in the cycle that starts from the time t1 to the output circuit 60.

In addition, in a cycle that starts from the time t4, communication is performed between the output circuit 60 and the external device, and a process value reply (a data return in FIG. 7 and a process value data in FIG. 8) is transmitted from the output circuit 60 to the external device.

Accordingly, a process for one cycle in which the process value is output ends. In addition, the same process as the process for one cycle is performed continuously after the time t5. That is, in a cycle that starts from the time t5, the same process as in the cycle that starts from the time t1 is performed. In a cycle that starts from the time t6, the same process as in the cycle that starts from the time t2 is performed. In a cycle that starts from the time t7, the same process as in the cycle that starts from the time t3 is performed. In a cycle that starts from the time t8, the same process as in the cycle that starts from the time t4 is performed. As shown in FIG. 9, a period of the process is T (a difference between an end time of process value update that starts from the time t1 and an end time of process value update that starts from the time t5). T is, for example, several hundreds of milliseconds (within a range of 100 milliseconds or more and one second or less). For example, the length of T can be preset.

In FIG. 10, in a cycle that starts from the time t21, communication is performed between the external device and the output circuit 60, and a waveform request command (an acquired waveform request in FIG. 7 and a waveform request in FIG. 8) is transmitted from the external device to the output circuit 60 (communication receiver).

In addition, in a cycle that starts from the time t22, communication is performed between the output circuit 60 and the CPU 50, and a waveform request command is transmitted from the output circuit 60 to the CPU 50.

In addition, in a cycle that starts from the time t23, communication is performed between the CPU 50 and the waveform acquisition memory 40, and a waveform request command (waveform acquisition in FIG. 6 and a read request in FIG. 8) is transmitted from the CPU 50 to the waveform acquisition memory 40. In response to the waveform request command, the waveform acquisition memory 40 reads store data that is stored.

Then, in a cycle that starts from the time t24, communication is performed between the waveform acquisition memory 40 and the CPU 50, and a waveform data reply (acquired waveform data in FIG. 6 and waveform data output in FIG. 8) is transmitted from the waveform acquisition memory 40 to the CPU 50.

In addition, in a cycle that starts from the time t25, communication is performed between the CPU 50 and the output circuit 60, and a waveform data reply is transmitted from the CPU 50 to the output circuit 60.

Then, in a cycle that starts from the time t26, communication is performed between the output circuit 60 and the external device, and a waveform data reply (an acquired waveform return in FIG. 7 and waveform data in FIG. 8) is transmitted from the output circuit 60 to the external device.

A cycle during which the external device acquires waveform data is, for example, several hundreds of milliseconds or a few seconds (within a range of 100 milliseconds or more and 10 seconds or less). For example, the length of the cycle during which waveform data is acquired can be preset.

Here, the field device 1 is a device, for example, a vortex flowmeter, an ultrasonic flowmeter, a Coriolis flowmeter, an electromagnetic flowmeter, a pressure gauge, or a differential pressure gauge, but it is not limited to those listed here.

Here, an embodiment as a vortex flowmeter will be described after a second embodiment.

The ultrasonic flowmeter is a device configured to calculate a flow rate based on a propagation time of an ultrasonic wave that is transmitted in a fluid, a frequency shift (Doppler effect) of an ultrasonic wave that propagates in a fluid, and the like.

The Coriolis flowmeter is a device configured to detect a Coriolis force that is applied to a fluid and calculate a flow rate.

The electromagnetic flowmeter is a device configured to detect an electromotive force generated in a measurement target fluid to which a magnetic field is applied in at least one electrode and calculate a flow rate based on the detected electromotive force.

The pressure gauge is a device configured to measure a pressure of a fluid.

The differential pressure gauge is a device configured to calculate a flow rate based on a difference between pressures of a fluid at a plurality of points.

The operation principle and the mounting method itself of the devices listed here are based on the related art. However, when the present embodiment is applied to these devices, a measurement device such as an oscilloscope is not directly connected, and a person can visually check a signal waveform in a processing process of each device.

As described above, the field device 1 can transmit waveform data of a signal in a process of obtaining an output value (process value) to the external device. In addition, the external device can receive the waveform data and display the waveform on the screen or the like based on the waveform data. That is, when a communication unit between the field device 1 and the external device is appropriately provided, the external device provided at a location away from the field device 1 can check a signal waveform in the processing process in the field device. In addition, when, for example, a general purpose personal computer, a smartphone, a tablet terminal or the like is used as the external device, even if a special measurement instrument is not provided, the above waveform can be observed easily.

Second Embodiment

Next, a second embodiment will be described. Here, parts that have already described in the previous embodiment will not be described below. Here, parts specific to the present embodiment will be mainly described.

Figure 11:
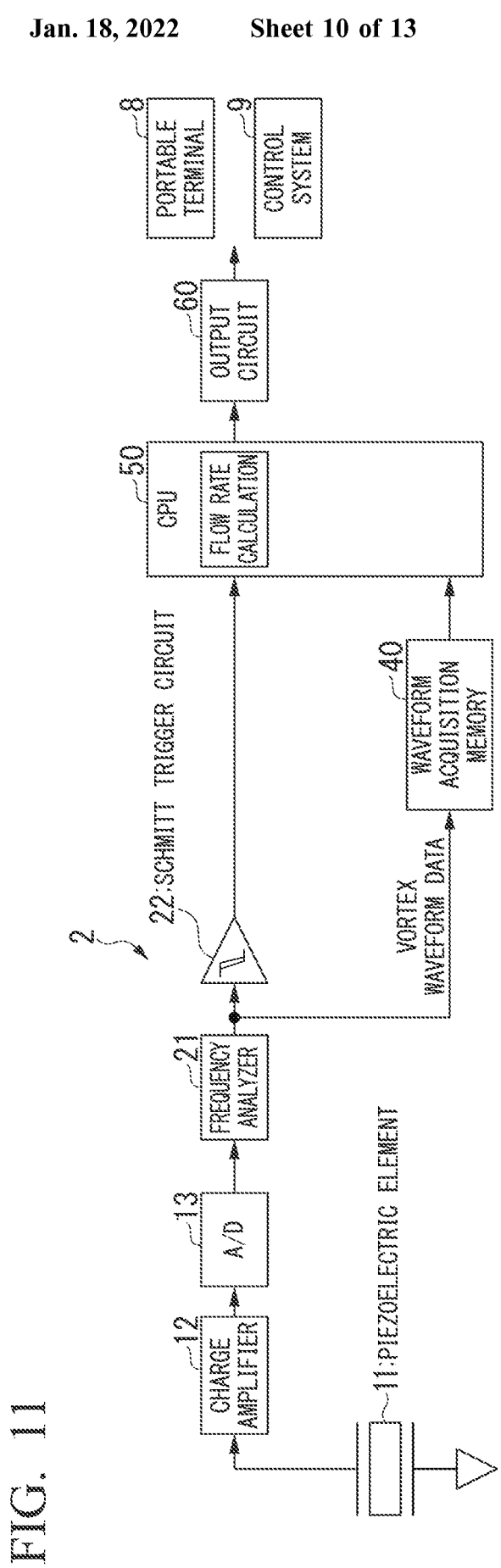
FIG. 11 is a block diagram showing a schematic functional configuration of a measurement system according to a second embodiment.

FIG. 11 is a block diagram showing a schematic functional configuration of a measurement system according to the present embodiment. As shown, the measurement system includes a field device 2, the portable terminal 8, and the control system 9. The field device 2 in the present embodiment is a vortex flowmeter. That is, the field device 2 detects an alternating lift that is generated by the Karman vortex, processes the vortex signal, and thus computes a flow rate based on a frequency of the vortex signal and set parameters, and outputs the result. The field device 2 includes a piezoelectric element 11, a charge amplifier 12, an A/D converter 13, a frequency analyzer 21, a Schmitt trigger circuit 22, the waveform acquisition memory 40, the CPU 50, and the output circuit 60. Functions of the units shown here will be described below.

Here, the field device 2 according to the present embodiment can be regarded as one special form of the field device 1 in the first embodiment. In this case, the piezoelectric element 11, the charge amplifier 12, and the A/D converter 13 correspond to the sensor 10 of the first embodiment. In addition, the frequency analyzer 21 and the Schmitt trigger circuit 22 correspond to the signal processor 20 of the first embodiment. Here, in the field device 2 according to the present embodiment, since the waveform acquisition memory 40 acquires only one type of waveform data, the multiplexer 30 in the first embodiment is not provided.

The piezoelectric element 11 detects an alternating lift that is generated by the Karman vortex of a fluid and outputs it as a charge signal. For example, the piezoelectric element 11 is installed behind (on the downstream side of) a vortex shedder bar that is disposed to block a flow of a fluid in a pipe in a plant or the like, or built into a vortex shedder bar.

The charge amplifier 12 converts the charge signal output from the piezoelectric element 11 into a voltage signal.

The A/D (analog-to-digital) converter 13 converts the voltage signal (analog signal) output from the charge amplifier into a digital signal.

That is, the piezoelectric element 11 configured to detect a vortex waveform of a fluid, the charge amplifier 12 configured to convert an output from the piezoelectric element 11 into a voltage signal, and the A/D converter 13 configured to convert an analog signal output from the charge amplifier 12 into a digital signal correspond to the sensor 10 in the first embodiment.

The frequency analyzer 21 performs frequency analysis based on the digital signal output from the A/D converter 13 and extracts a vortex signal. The vortex signal extracted by the frequency analyzer 21 is a signal close to a sine wave. The frequency analyzer 21 outputs the extracted vortex signal. The vortex signal is a signal representing a vortex waveform.

The Schmitt trigger circuit 22 forms the vortex signal output from the frequency analyzer 21 into a pulse and outputs the pulse signal. A frequency of this pulse signal corresponds to a frequency of the above vortex signal. That is, the frequency of the pulse signal corresponds to a frequency of the Karman vortex detected by the original piezoelectric element 11. The pulse signal output from the Schmitt trigger circuit 22 is delivered to the CPU 50.

Alternatively, a count circuit may be provided between the Schmitt trigger circuit 22 and the CPU 50 and a signal of the number of pulses counted by the count circuit may be delivered to the CPU 50.

That is, the frequency analyzer 21 and the Schmitt trigger circuit 22 obtain a pulse signal having a cycle corresponding to a cycle of the vortex waveform based on the signal of the vortex waveform output from the sensor and output the pulse signal. That is, the frequency analyzer 21 and the Schmitt trigger circuit 22 correspond to the signal processor 20 in the first embodiment.

The CPU 50 fetches the pulse signal output from the Schmitt trigger circuit 22. Alternatively, when the above count circuit is provided, a signal of the number of pulses output from the count circuit is fetched. Then, the CPU 50 performs frequency calculation, flow rate calculation, correction calculation, and the like based on the number of pulses input within a predetermined time, and outputs a flow rate signal indicating a flow rate. A conventional technique can be used as a process itself of computing a flow rate based on the pulse signal corresponding to the Karman vortex. The CPU 50 delivers the flow rate signal to the output circuit 60, for example, as a pulse signal.

The output circuit 60 converts the flow rate signal delivered from the CPU 50 into a predetermined mode and outputs the result. The output signal outputs a flow rate signal as, for example, a 4-20 mA analog instrumentation signal or digital instrumentation signal.

A value of the flow rate computed by the CPU 50 in the present embodiment is one type of the process value in the first embodiment.

The waveform acquisition memory 40 acquires the vortex signal (the signal in the processing process of the signal processor 20) delivered from the frequency analyzer 21 to the Schmitt trigger circuit 22 as vertex waveform data. The waveform acquisition memory 40 sequentially stores the acquired waveform data. In addition, the waveform acquisition memory 40 delivers the accumulated waveform data to the CPU 50 in response to a waveform acquisition request from the CPU 50.

For example, the CPU 50 reads waveform data from the waveform acquisition memory 40 based on the request from the host device. Then, the CPU 50 delivers the read waveform data to the output circuit 60.

The output circuit 60 converts the waveform data delivered from the CPU 50 into a predetermined mode and outputs the result.

Here, the connection between the field device 2 and the portable terminal 8 or the control system 9 is not limited to connection according to communication of Wired, Industry Standard, but a device-specific output port may be provided and a device-specific communication standard may be used.

As described above, the CPU 50 included in the field device 2 outputs flow rate value (process value) data and waveform data to the outside through the output circuit 60. The flow rate value data and waveform data are transmitted to, for example, the portable terminal 8 and the control system 9.

On the side of the portable terminal 8 or the control system 9, when an installed program is executed, a waveform (vortex waveform) can be drawn based on the waveform data received from the field device 2 and displayed on the screen.

Third Embodiment

Next, a third embodiment will be described. Here, parts that have already described in the previous embodiments will not be described below. Here, parts specific to the present embodiment will be mainly described.

Figure 12:
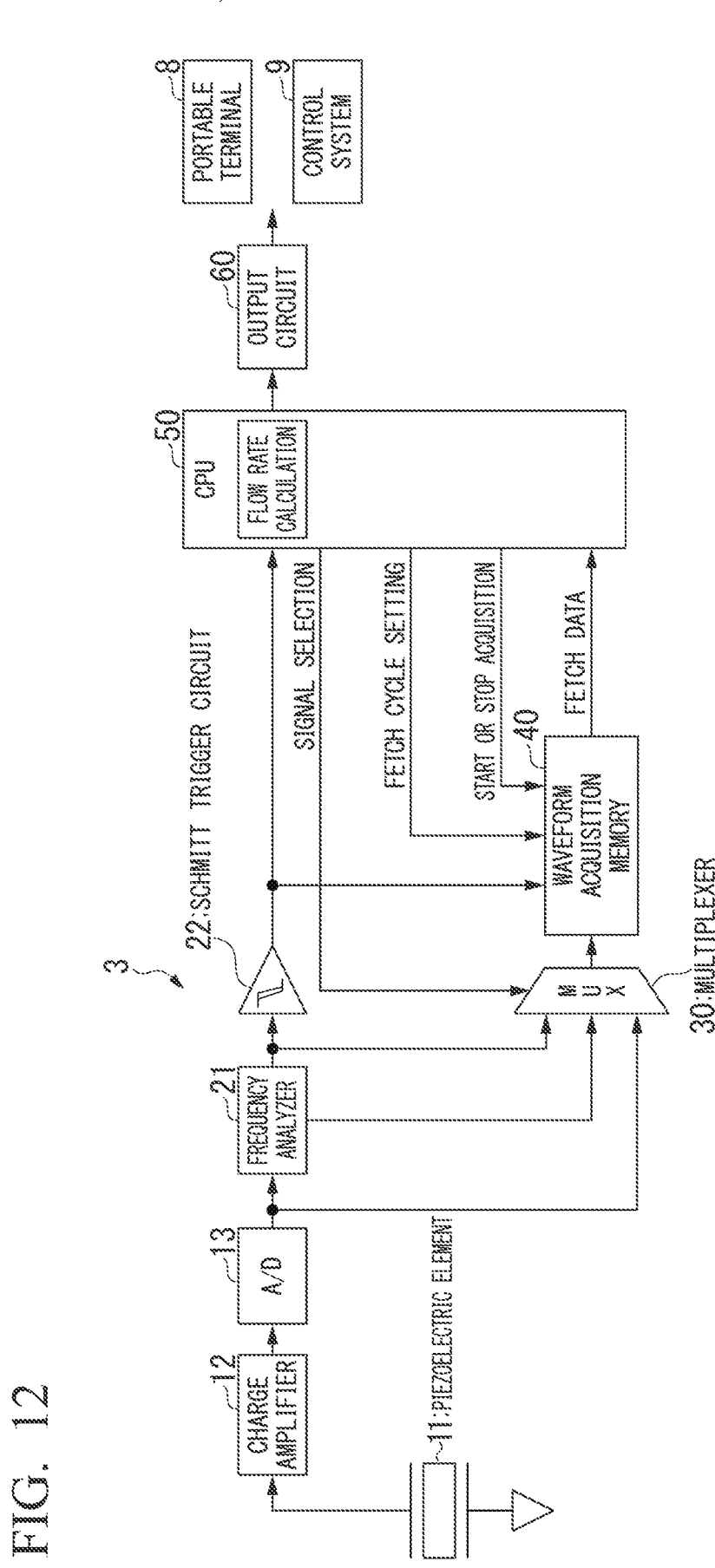
FIG. 12 is a block diagram showing a schematic functional configuration of a measurement system according to a third embodiment.

FIG. 12 is a block diagram showing a schematic functional configuration of a measurement system according to the present embodiment. As shown, the measurement system includes a field device 3, the portable terminal 8, and the control system 9. The field device 3 in the present embodiment is also a vortex flowmeter as in the second embodiment. The field device 3 includes the piezoelectric element 11, the charge amplifier 12, the A/D converter 13, the frequency analyzer 21, the Schmitt trigger circuit 22, the multiplexer (MUX) 30, the waveform acquisition memory 40, the CPU 50, and the output circuit 60.

One feature of the field device 3 according to the present embodiment is that the multiplexer 30 is provided at a stage ahead the waveform acquisition memory 40. Thus, it is possible to acquire not only a signal at a specific location in the field device but also waveforms of signals at various locations.

The multiplexer 30 receives signals at plurality of stages in the signal processing process in the field device 3, multiplexes these signals, and supplies the result to the waveform acquisition memory 40. In addition, signals at the plurality of stages can be appropriately selected. The multiplexer 30 receives a signal of "signal selection" from the CPU 50 and selects a signal to be output based on this signal selection. In this case, the multiplexer 30 supplies only the selected signal to the waveform acquisition memory 40. Here, in the configuration example shown in FIG. 12, signals input to the multiplexer 30 are three types of signals: a signal output from the A/D converter 13, a signal in the processing process in the frequency analyzer 21, and a signal output from the frequency analyzer 21 to the Schmitt trigger circuit 22.

The CPU 50 appropriately supplies the signal of "signal selection" to the multiplexer 30.

In addition, another feature of the present embodiment is that a control signal from the CPU 50 is input to the waveform acquisition memory 40. Specifically, the waveform acquisition memory 40 receives a signal of "fetch cycle setting" from the CPU 50 and thus sets a cycle during which a waveform is fetched. That is, it is possible to arbitrarily set a waveform acquisition cycle from the side of the CPU 50. In addition, the waveform acquisition memory 40 receives a signal for controlling start or stop of waveform acquisition from the CPU 50. The waveform acquisition memory 40 starts or stops acquiring waveform based on the signal of start or stop of waveform acquisition.

Therefore, for example, under control of the external device, the waveform can be acquired or transferred only when waveform data is required, and an amount of information output from the output circuit 60 can be controlled and power consumed by the field device 3 can be reduced.

Alternatively, for example, it is possible to start or stop waveform reading based on an autonomous control of the CPU 50 so that a waveform is acquired only when an abnormality is detected based on a determination process performed by the CPU 50.

In addition, the CPU 50 may perform control such that a waveform memory acquirer 40 acquires waveform data constantly. Then, the CPU 50 may acquire waveform data at an arbitrary timing from the waveform memory acquirer 40.

In addition, the waveform acquisition memory 40 of the present embodiment acquires a waveform of a pulse signal output from the Schmitt trigger circuit 22 and stores the waveform. Therefore, it is possible to output a pulse signal in a form synchronized with the waveform of the vortex signal or the like. Thus, for example, the external device can display various waveforms of vortex signals and the like and the pulse signal output from the Schmitt trigger circuit 22 on the screen in an overlapping manner, and analyze the field device 3 more easily.

As described above, in the present embodiment, the same effects as in the second embodiment can be obtained. In addition, the field device 3 (flowmeter) according to the present embodiment can multiplex a plurality of signals, and acquire and output waveform data of the signals. In addition, the field device 3 (flowmeter) can select and output only waveform data of a required signal among a plurality of signals.

In addition, according to the field device 3, under control from the outside or autonomous control of the CPU 50, it is possible to start or stop waveform acquisition.

Fourth Embodiment

Next, a fourth embodiment will be described. Here, parts that have already described in the previous embodiments will not be described below. Here, parts specific to the present embodiment will be mainly described.

Figure 13:
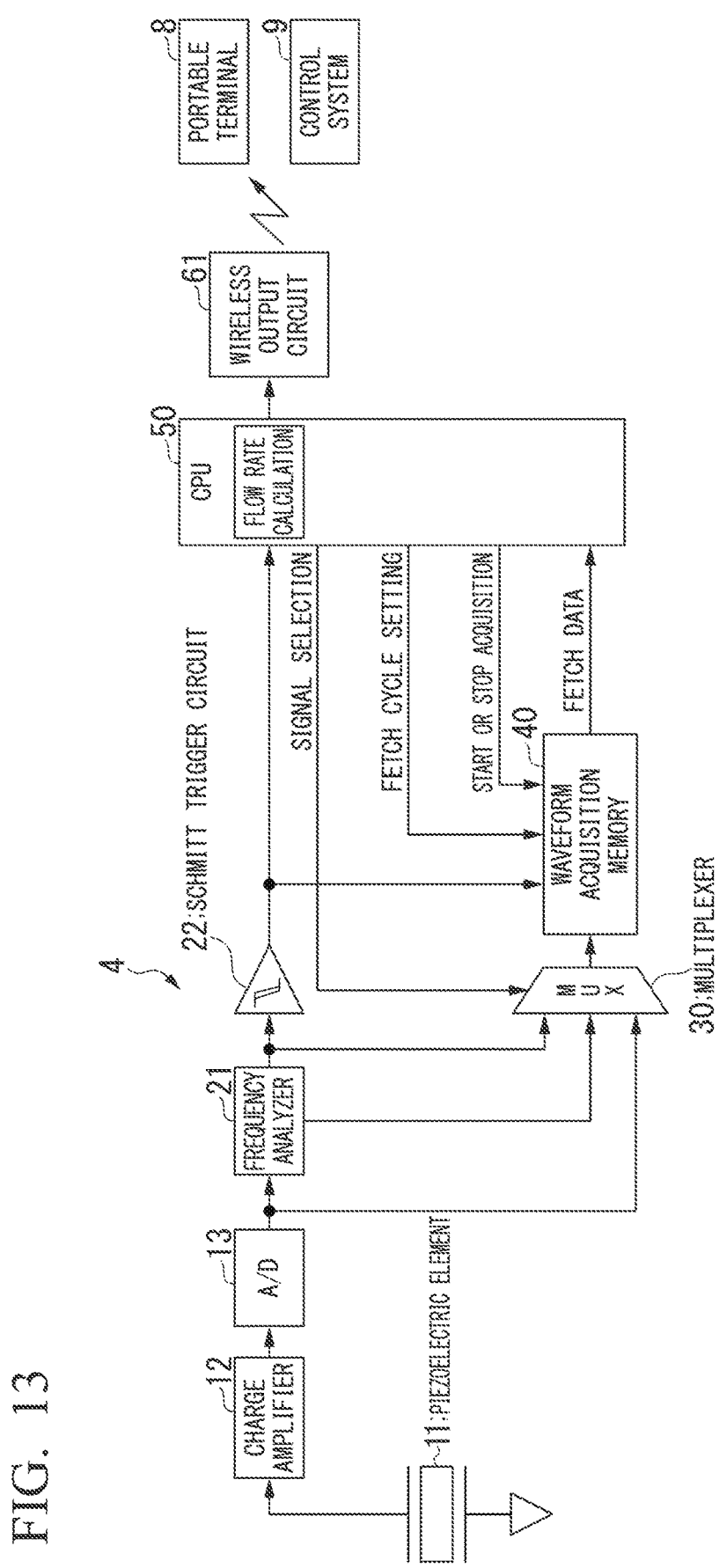
FIG. 13 is a block diagram showing a schematic functional configuration of a measurement system according to a fourth embodiment.

FIG. 13 is a block diagram showing a schematic functional configuration of the measurement system according to the present embodiment. As shown, the measurement system includes a field device 4, the portable terminal 8, and the control system 9. The field device 4 in the present embodiment is also a vortex flowmeter as in the second embodiment and the like. The field device 4 includes the piezoelectric element 11, the charge amplifier 12, the A/D converter 13, the frequency analyzer 21, the Schmitt trigger circuit 22, the multiplexer (MUX) 30, the waveform acquisition memory 40, the CPU 50, and a wireless output circuit 61 (outputter).

A feature of the field device 4 according to the present embodiment is that the wireless output circuit 61 is provided in place of the output circuit 60 in the third embodiment.

The wireless output circuit 61 performs bidirectional communication between it and the portable terminal 8 or the control system 9 using a wireless signal. Specifically, the wireless output circuit 61 transmits and receives data to and from the portable terminal 8 or the control system 9 using the existing wireless communication technology standards such as Wi-Fi, Bluetooth (registered trademark), IrDA (Infrared Data Association), ISA 100, WirelessHART, and ZigBee. Here, regarding communication that is performed by the wireless output circuit 61 with the external device, a procedure in the upper layer (a layer higher than a physical layer) is the same as the procedure that is performed by the output circuit 60 in the second embodiment and the like.

That is, the outputter transmits waveform data to the external device through not only wired communication but also wireless communication.

Functions and processing procedures of units of the field device 4 other than the wireless output circuit 61 are the same as the functions and processing procedures of the corresponding units in the third embodiment.

In the present embodiment, the same effects as in the third embodiment can be obtained. In addition, when the field device 4 (flowmeter) according to the present embodiment includes the wireless output circuit 61, waveform data can be transmitted to the external device using a wireless signal. That is, even if the external device is located at a position away from the field device 4, there is no need to set a communication line or the like between two devices.

Fifth Embodiment

Next, a fifth embodiment will be described. Here, parts that have already described in the previous embodiments will not be described below. Here, parts specific to the present embodiment will be mainly described.

Figure 14:
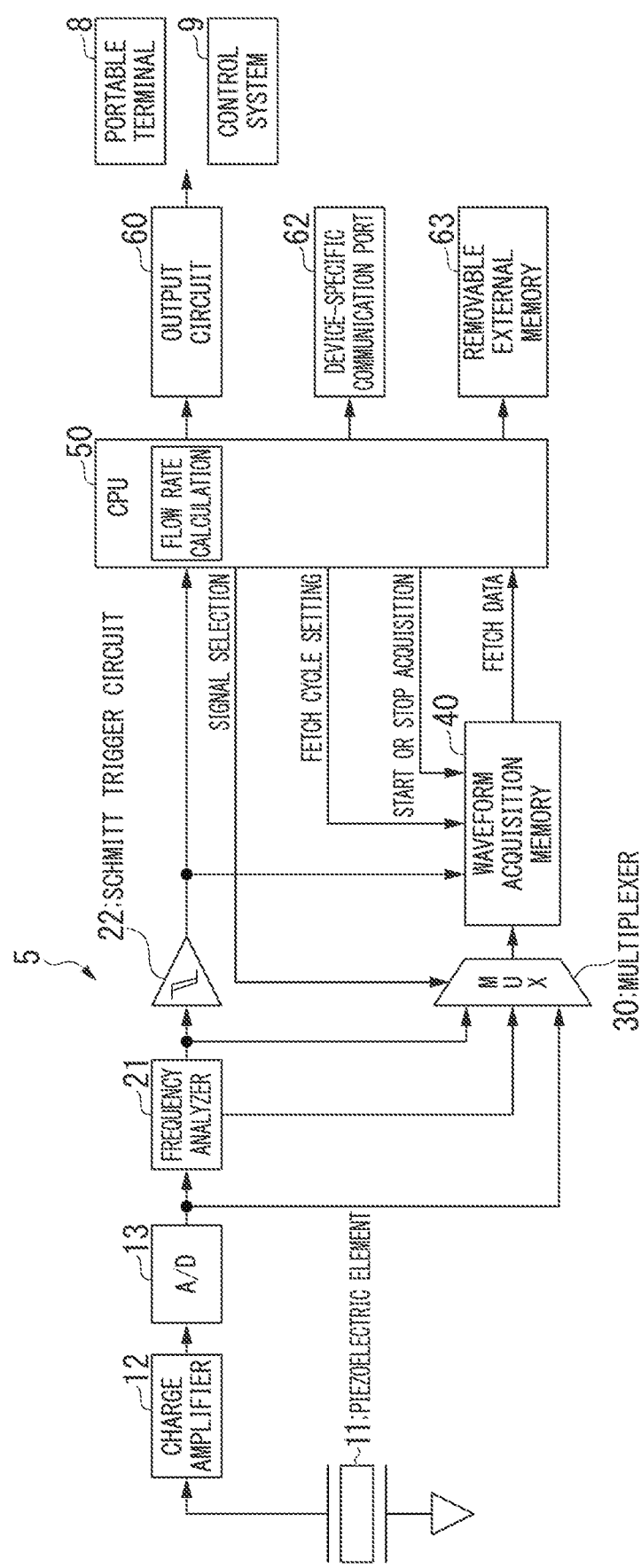
FIG. 14 is a block diagram showing a schematic functional configuration of a measurement system according to a fifth embodiment.

FIG. 14 is a block diagram showing a schematic functional configuration of a measurement system according to the present embodiment. As shown, the measurement system includes a field device 5, the portable terminal 8, and the control system 9. The field device 4 in the present embodiment is also a vortex flowmeter as in the second embodiment and the like. The field device 5 includes the piezoelectric element 11, the charge amplifier 12, the A/D converter 13, the frequency analyzer 21, the Schmitt trigger circuit 22, the multiplexer (MUX) 30, the waveform acquisition memory 40, the CPU 50, the output circuit 60, a device-specific communication port 62 (outputter), a removable external memory 63 (outputter).

A feature of the field device 5 according to the present embodiment is that the device-specific communication port 62 and the removable external memory 63 are provided in addition to the output circuit 60 in the third embodiment. The device-specific communication port 62 and the removable external memory 63 have the same function as the output circuit 60. Alternatively, the device-specific communication port 62 and the removable external memory 63 may have a function of only outputting data in one direction without receiving a command and the like from the outside.

The device-specific communication port 62 is a communication port based on an interface specification specific to the field device 5. When the device-specific communication port 62 is used, it is possible to perform communication with the external device using a method specific to the field device 5. The field device 5 can communicate with the external device using commands and data (output value data, waveform data, and the like) through the device-specific communication port 62.

The removable external memory 63 includes a portable recording medium and a device for reading and writing (or a circuit) thereof. As the removable external memory 63, a recording medium, for example, an SD memory card (SD is an abbreviation of "secure digital"), a USB memory (USB is an abbreviation of "Universal Serial Bus"), a Compact Flash card ("Compact Flash" is a registered trademark), or an optical disc, can be used. The CPU 50 can write data in these recording mediums through a predetermined interface. When the removable external memory 63 is used, even in a situation in which communication connection between the field device 5 and the external device is difficult, data (waveform data and process value data (computed flow rate data)) can be written in the removable external memory 63. Then, when the removable external memory 63 is removed from the field device 5, another device (for example, a general purpose personal computer) can read and use the written data.

That is, the outputter writes the waveform data in a removable (portable) recording medium.

In the present embodiment, the same effects as in the third embodiment and the like can be obtained. In addition, the field device 5 (flowmeter) according to the present embodiment can output waveform data from a device-specific communication port. In addition, the field device 5 (flowmeter) according to the present embodiment can write waveform data in a removable external memory. Thus, even in an installation place in which wired or wireless communication is difficult or the like, the external device can acquire waveform data and display the waveform.

Modified Examples

While the plurality of embodiments have been described above, the embodiments may be implemented as modified examples as follows.

For example, when data (such as waveform data) is output from the output circuit 60, the wireless output circuit 61, or the device-specific communication port 62 or when data is written in the removable external memory 63, encoding for error detection or error correction may be performed. Specifically, for example, a checksum is added or a cyclic redundancy check code (CRC) is added. Accordingly, on the side of the external device that uses data, it is possible to check the accuracy of the data.

In addition, the waveform acquisition memory 40 may acquire an analog waveform and store waveform data thereof. In this case, the waveform acquisition memory 40 includes an A/D converter configured to convert a sample value of an input analog signal into digital data therein.

In addition, when the plurality of embodiments and plurality of modified examples described above can be combined, they may be implemented in combination. As an example, the wireless output circuit 61 of the fourth embodiment may be provided in place of the output circuit 60 in the field device (having no multiplexer 30) of the second embodiment. This similarly applies to other combinations.

Here, functions (or a part thereof) of the device such as the field device, the portable terminal, or the control system in the above-described embodiment may be realized by a computer and a program. In this case, a program for realizing this function is recorded in a computer readable recording medium, and a computer system reads and executes the program recorded in the recording medium for realization. Note that the "computer system" here includes an OS and hardware such as peripheral devices. In addition, the "computer readable recording medium" refers to a portable medium such as a flexible disk, a magneto optical disc, a ROM, a CD-ROM, a DVD-ROM, and a USB memory or a storage device such as a hard disk built into the computer system. Further, the "computer readable recording medium" may include a medium that dynamically maintains a program for a short time like a communication line when a program is transmitted via a network such as the Internet or a communication line such as a telephone line and a medium that maintains a program for a certain time like a volatile memory in the computer system serving as a server or a client in that case. In addition, the program may be a program for realizing some of the above-described functions and the above-described functions may be realized in a combination with a program already recorded in the computer system. In addition, the program may be a so-called firmware.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field device that is communicable with a terminal device, comprising:
   a sensor configured to detect a physical quantity and to output the physical quantity as a sensor signal;
   a signal processor configured to process the sensor signal and to output the sensor signal as a processing result signal;
   a calculation processor configured to calculate output value data based on the processing result signal;
   an outputter configured to output the output value data to the outside;
   a multiplexer configured to multiplex the processing result signal and a processing process signal that is a signal in a processing process in the signal processor; and
   a waveform acquirer configured to store waveform data of the processing result signal and the processing process signal, which are multiplexed by the multiplexer,
   wherein the calculation processor is configured to set a fetch cycle of the waveform data to the waveform acquirer or control starting of fetching the waveform data,
   wherein, when the field device receives a waveform request command from the terminal device, the calculation processor is configured to acquire the waveform data of the processing result signal and the processing process signal from the waveform acquirer in accordance with the fetch cycle or the starting, and to transmit the waveform data via the outputter to the terminal device, and
   wherein the multiplexer is configured to receive, from the calculation processor, a signal of signal selection for selecting one of the processing result signal and the processing process signal, and the multiplexer is configured to multiplex the processing result signal and the processing process signal when the signal of signal selection is sequentially changed at predetermined time intervals.

2. The field device according to claim 1,
   wherein the calculation processor is configured to instruct the waveform acquirer to start acquisition of the waveform data or to instruct the waveform acquirer to stop acquisition of the waveform data.

3. The field device according to claim 1,
   wherein the calculation processor is configured to output the waveform data via the outputter to the outside through wireless communication or wired communication.

4. The field device according to claim 1,
   wherein the calculation processor is configured to write the waveform data in a recording medium that is removable from the field device.

5. The field device according to claim 1,
   wherein the sensor comprises:
   a piezoelectric element configured to detect a vortex waveform that is generated in a fluid; and
   an AD converter configured to convert an analog signal output from the piezoelectric element into a digital signal,
   wherein the signal processor is configured to output a pulse signal having a cycle of a digital signal of the vortex waveform based on the digital signal of the vortex waveform output from the sensor, and
   wherein the calculation processor is configured to calculate a flow rate of the fluid as the output value data based on a frequency of the pulse signal and information about a preset flow path.

6. The field device according to claim 5,
   wherein the signal processor comprises:
   a frequency analyzer configured to perform frequency analysis based on the digital signal output from the AD converter and to extract a vortex signal; and
   a Schmitt trigger circuit configured to form the vortex signal output from the frequency analyzer into a pulse and to output a pulse signal to the calculation processor.

7. A system comprising:
   the field device according to claim 1; and
   an external device configured to display the waveform data output from the field device on a screen.

8. The system according to claim 7,
   wherein the calculation processor is configured to instruct the waveform acquirer to start acquisition of the waveform data or to instruct the waveform acquirer to stop acquisition of the waveform data.

9. The system according to claim 7,
   wherein the calculation processor is configured to output the waveform data via the outputter to the outside through wireless communication or wired communication.

10. The system according to claim 7,
    wherein the calculation processor is configured to write the waveform data in a recording medium that is removable from the field device.

11. The system according to claim 7,
    wherein the sensor comprises:
    a piezoelectric element configured to detect a vortex waveform that is generated in a fluid; and
    an AD converter configured to convert an analog signal output from the piezoelectric element into a digital signal,
    wherein the signal processor is configured to output a pulse signal having a cycle of a digital signal of the vortex waveform based on a digital signal of the vortex waveform output from the sensor, and
    wherein the calculation processor is configured to calculate a flow rate of the fluid as the output value data based on a frequency of the pulse signal and information about a preset flow path.

12. The system according to claim 11,
    wherein the signal processor comprises:
    a frequency analyzer configured to perform frequency analysis based on the digital signal output from the AD converter and to extract a vortex signal; and
    a Schmitt trigger circuit configured to form the vortex signal output from the frequency analyzer into a pulse and to output a pulse signal to the calculation processor.

13. A method of outputting waveform data from a field device that is communicable with a terminal device, comprising:
    detecting, by a sensor, a physical quantity, and outputting the physical quantity as a sensor signal;
    processing, by a signal processor, the sensor signal, and outputting the sensor signal as a processing result signal;
    calculating, by a calculation processor, output value data based on the processing result signal;

outputting, by an outputter, the output value data to the outside;

multiplexing, by a multiplexer, the processing result signal and a processing process signal that is a signal in a processing process in the signal processor;

storing, by a waveform acquirer, waveform data of the processing result signal and the processing process signal which are multiplexed by the multiplexer;

setting, by the calculation processor, a fetch cycle of the waveform data to the waveform acquirer or controlling starting of fetching the waveform data;

when the field device receives a waveform request command from the terminal device, acquiring, by the calculation processor, the waveform data of the processing result signal and the processing process signal from the waveform acquirer in accordance with the fetch cycle or the starting, and transmitting the waveform data via the outputter to the terminal device;

receiving, by the multiplexer, from the calculation processor, a signal of signal selection for selecting one of the processing result signal and the processing process signal; and multiplexing, by the multiplexer, the processing result signal and the processing process signal when the signal of signal selection is sequentially changed at predetermined time intervals.

14. The method of outputting waveform data according to claim 13, further comprising:

instructing, by the calculation processor, the waveform acquirer to start acquisition of the waveform data or instructing the waveform acquirer to stop acquisition of the waveform data.

15. The method of outputting waveform data according to claim 13, further comprising:

outputting, by the calculation processor, the waveform data via the outputter to the outside through wireless communication or wired communication.

16. The method of outputting waveform data according to claim 13, further comprising:

writing, by the calculation processor, the waveform data in a recording medium that is removable from the field device.

17. The method of outputting waveform data according to claim 13, wherein the sensor comprises a piezoelectric element and an AD converter, and wherein the method of outputting waveform data further comprises:

detecting, by the piezoelectric element, a vortex waveform that is generated in a fluid;

converting, by the AD converter, an analog signal output from the piezoelectric element into a digital signal;

outputting, by the signal processor, a pulse signal having a cycle of a digital signal of the vortex waveform based on the digital signal of the vortex waveform output from the sensor; and calculating, by the calculation processor, a flow rate of the fluid as the output value data based on a frequency of the pulse signal and information about a preset flow path.

* * * * *